United States Patent [19]  
Shigemasa et al.

[11] Patent Number: 4,466,054  
[45] Date of Patent: Aug. 14, 1984

[54] IMPROVED PROPORTIONAL INTEGRAL-DERIVATIVE CONTROL APPARATUS

[75] Inventors: Takashi Shigemasa; Yasuo Takagi, both of Yokohama, Japan

[73] Assignee: Tokyo Shibaura Denki Kabushiki Kaisha, Kawasaki, Japan

[21] Appl. No.: 381,445

[22] Filed: May 24, 1982

[30] Foreign Application Priority Data

Jun. 1, 1981 [JP] Japan ............................... 56-82512

[51] Int. Cl.³ .............................................. G05B 13/04
[52] U.S. Cl. ................................... 364/162; 364/157; 364/179; 318/636; 318/561; 318/610
[58] Field of Search ............... 364/157, 161, 162, 160, 364/163, 178, 179; 318/609, 610, 561, 636

[56] References Cited

U.S. PATENT DOCUMENTS

| | | | |
|---|---|---|---|
| 3,490,691 | 1/1970 | Uyetani et al. | 318/636 X |
| 3,552,428 | 1/1971 | Pemberton | 364/157 X |
| 3,578,957 | 5/1971 | Gatlin | 364/178 |
| 4,232,364 | 11/1980 | Bibbero | 364/162 X |
| 4,265,263 | 5/1981 | Hobbs | 364/161 X |
| 4,346,433 | 8/1982 | Rutledge | 364/162 |
| 4,349,868 | 9/1982 | Brown | 364/157 |
| 4,368,510 | 1/1983 | Anderson | 364/162 X |
| 4,407,013 | 9/1983 | Arcara et al. | 364/157 X |

FOREIGN PATENT DOCUMENTS 2015771 9/1979 United Kingdom .

OTHER PUBLICATIONS

Automatica, "On Self Tuning Regulators", vol. 9, 1973, pp. 185-199, by: K. J. Astrom and B. Wittenmark.  
IEEE Transactions on Automatic Control, "Identifiability Conditions for Linear Multivariable Systems Operating Under Feedback", by: T. Soderstrom et al., Dec. 1976, pp. 837-840.

Primary Examiner—Jerry Smith  
Assistant Examiner—Allen MacDonald  
Attorney, Agent, or Firm—Oblon, Fisher, Spivak, McClelland & Maier

[57] ABSTRACT

A process control apparatus is provided which has a PID controller to which is supplied a sampled signal of a control deviation signal of a process value signal and a reference signal and which generates a PID control signal according to sampled-value PID control constants. A non-linear controller is connected in parallel with the PID controller. A sum signal of the output signals from the PID controller and the non-linear controller is supplied to a process through a holding circuit. The process control apparatus further includes a circuit for identifying the dynamic characteristic of the process according to the sum signal and the sampled signal of the process value, and a circuit for calculating a transfer function of the process in the Laplace operator domain and for determining the sampled-value PID constants of the PID controller according to the dynamic characteristic.

5 Claims, 6 Drawing Figures

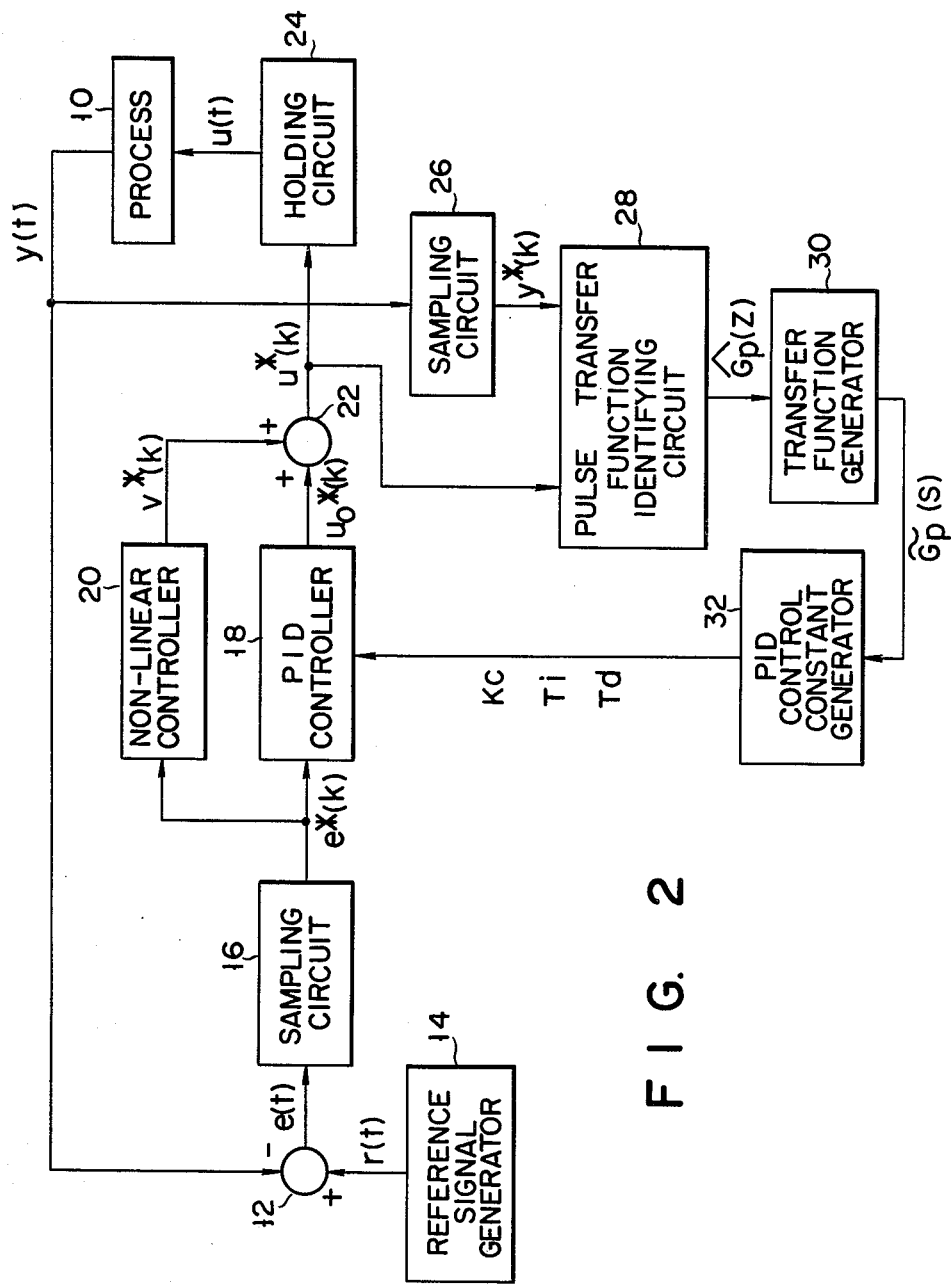
F I G. 2

IMPROVED PROPORTIONAL INTEGRAL-DERIVATIVE CONTROL APPARATUS

BACKGROUND OF THE INVENTION

The present invention relates to a process control apparatus capable of determining optimum control constants according to the characteristic of a process, which is obtained by using a sampled process value under closed loop.

In a process controller, since the control constants must be determined based on the dynamic characteristic of the process, identification of the dynamic characteristic of the process is important. Identification of the dynamic characteristic is performed either in an open loop wherein the controller is disconnected from the process or in a closed loop wherein the controller is connected to the process. From the viewpoints of economy, quality control and safety, it is preferable to perform identification in a closed loop which is able to response to the dynamic characteristic change of the process in operation.

A process controller for controlling the process on the basis of the dynamic characteristic obtained in a closed loop is described, for example, in K. J. Aström and B. Wittenmark, "On Self Tuning Regulators" in "Automatica", Pergamon Press, Great Britain, Vol. 9, pp. 185-199. As this controller is of minimum variance type, when the reference value changes, an large operation signal is generated. This is not preferable in view of the energy required for generating such an operation signal. The PID controller has been used widely in industry. However, there is not a conventional PID digital controller of which the PID control constants can be automatically determined from the dynamic characteristic of the process under closed loop operation. For this reason, with the conventional PID controller, the operator manually adjusts the control constants while closely observing the response of the process value. This results in long adjustment time and troublesome operation.

SUMMARY OF THE INVENTION

It is, therefore, an object of the present invention to provide a process control apparatus which identifies the dynamic characteristic of a process in a closed loop whereby the sampled value PID control constants are automatically determined.

In order to achieve the above and other objects, there is provided a process control apparatus comprising a first sampler for sampling a control deviation signal of a process value signal and a reference value signal, a PID controller for converting an output signal from the first sampler into a sampled value PID control signal, a non-linear controller for non-linearly processing the output signal from the first sampler to generate a non-linear control signal, a holding circuit for holding a sum signal of output signals from the PID controller and the non-linear controller and for supplying a hold signal to a process for controlling the process, a second sampler for sampling a process value signal, and a calculating unit for calculating sampled value PID control constants on the basis of an output signal from the second sampler and the sum signal of the output signals from the PID controller and the non-linear controller and for supplying a calculation result to the PID controller.

BRIEF DESCRIPTION OF THE DRAWINGS

FIG. 2 is a block diagram of a process control apparatus according to an embodiment of the present invention;

DETAILED DESCRIPTION OF THE PREFERRED EMBODIMENT

Figure 1:
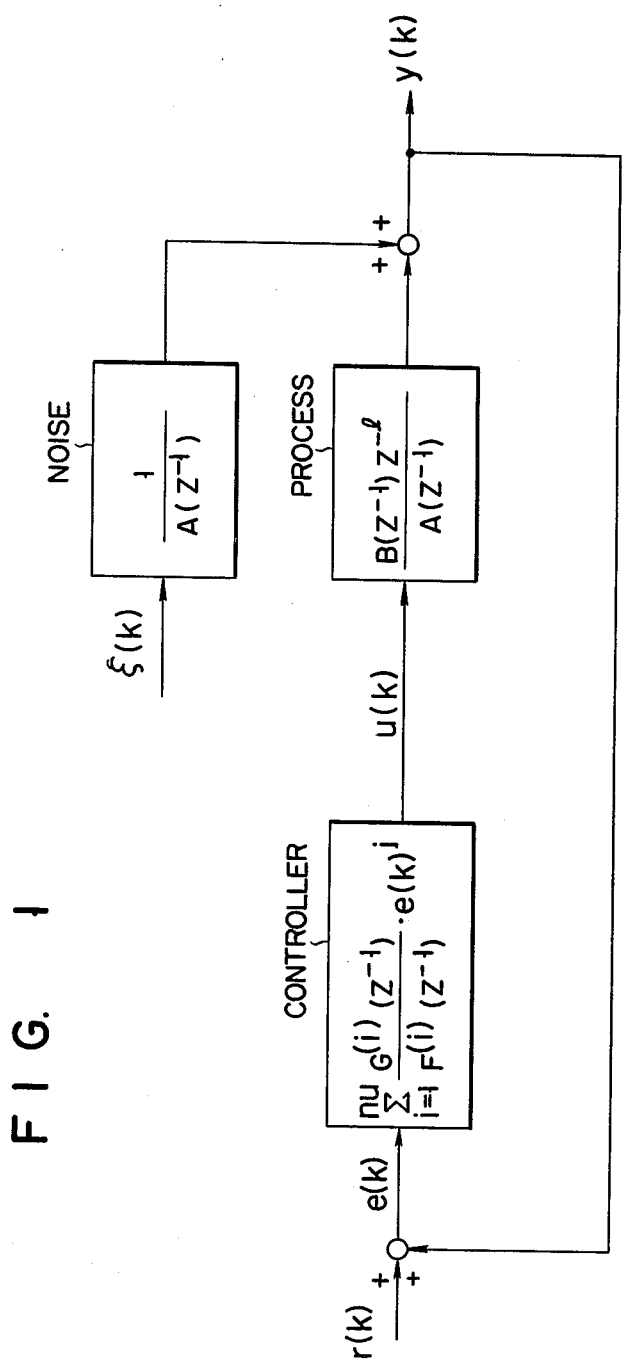
FIG. 1 is an equivalent circuit diagram of a control system for explaining the principle of closed loop identification according to the present invention.

The preferred embodiment of the present invention will now be described with reference to the accompanying drawings. The feature of the process control apparatus of this embodiment resides in that a non-linear controller is used for identifying the dynamic characteristic of the process controlled in a closed loop. The principle of the present invention will first be described. More specifically, the manner according to which the non-linear controller identifies the dynamic characteristic of the process controlled in the closed loop will be described. FIG. 1 shows an equivalent circuit diagram of the control system expressed discretely with respect to time. A process to be controlled is assumed to be of linear type. Let $y(k)$ denote a process value signal (output signal); $u(k)$, an input signal; $r(k)$, reference value signal; and $\xi(k)$, a system noise. Then, the process and the controller are expressed as follows:

$$A(Z^{-1})y(k) = B(Z^{-1})Z^{-l}u(k) + \xi(k) \tag{1}$$

$$u(k) = \sum_{i=1}^{nu} \frac{G^{(i)}(Z^{-1})}{F^{(i)}(Z^{-1})} \cdot e(k)^i \tag{2}$$

where $e(k) = r(k) - y(k)$ (3)

$$A(Z^{-1}) = 1 + a_1 Z^{-1} + \ldots + a_{na} Z^{-na} \tag{4}$$

$$B(Z^{-1}) = b_1 Z^{-1} + b_2 Z^{-2} + \ldots + b_{nb} Z^{-nb} \tag{5}$$

$$F^{(i)}(Z^{-1}) = 1 + f_1^{(i)} Z^{-1} + \ldots + f_{nf}^{(i)} Z^{-nf} \tag{6}$$

$$G^{(i)}(Z^{-1}) = g_0^{(i)} + g_1^{(i)} Z^{-1} + \ldots + g_{ng}^{(i)} Z^{-ng} \tag{7}$$

It follows from this that the dynamic characteristic (i.e., the pulse transfer function in this case) of the process is $$\frac{B(Z^{-1})Z^{-l}}{A(Z^{-1})}$$

The conditions for identification of parameters $A(Z^{-1})$ and $B(Z^{-1})$ from the input signal $u(k)$ and the output signal $y(k)$ will be shown below. Let us define the following vectors and matrix:

$$\theta = [a_1, a_2, \ldots, a_{na}, b_1, b_2, \ldots, b_{nb}]^T \tag{8}$$

$$Y = [y(k), y(k+1), \ldots, y(k+N-1)]^T \tag{9}$$

$$\Xi = [\xi(k), \xi(k+1), \ldots, \xi(k+N-1)]^T \tag{10}$$

$$\Phi = \tag{11}$$

-continued $$\begin{bmatrix} -y(k-1), \ldots, -y(k-na), u(k-l-1), \ldots, u(k-l-nb) \\ -y(k), \ldots, -y(k+1-na), u(k-l), \ldots, u(k+1-l-nb) \\ \ldots \\ -y(k+N-2), \ldots, -y(k+N-na-1), u(k+N-l-2), \ldots, \\ u(k+N-l-nb-1) \end{bmatrix}$$

$\theta$, Y, $\Xi$ and $\Phi$ hold the relation below:

$$Y = \Phi\theta + \Xi \tag{12}$$

The least square estimation $\hat{\theta}$ of the vector $\theta$ consisting of unknown parameters is given by the relation:

$$\hat{\theta} = (\Phi^T\Phi)^{-1}\Phi^T Y \tag{13}$$

where $$\hat{\theta} = [\hat{a}_1, \hat{a}_2, \ldots, \hat{a}_{na}, \hat{b}_1, \hat{b}_2, \ldots, \hat{b}_{nb}]^T$$

In order that $\hat{\theta}$ be an unbiased estimation, the following condition must be satisfied:

$$\lim_{N \to \infty} \frac{1}{N} \Phi^T \Xi = 0 \tag{14}$$

It follows from Eq. (14) that the system noise must be the white noise and $l \geq 0$.

On the other hand, in order that $\hat{\theta}$ be the unique estimator, the following correlation matrix R must be a non-singular matrix:

$$\lim_{N \to \infty} \frac{1}{N} \Phi^T \Phi = R \tag{15}$$

The correlation matrix R can be separated into the following submatrices:

$$R = \begin{pmatrix} R_{yy} & R_{yu} \\ R_{yu}^T & R_{uu} \end{pmatrix} = \begin{bmatrix} \phi_{yy}(0) & \cdots & \phi_{yy}(na-1) & -\phi_{yu}(l) & \cdots & -\phi_{yu}(l+nb-1) \\ \vdots & & \vdots & \vdots & & \vdots \\ \phi_{yy}(na-1) & \cdots & \phi_{yy}(0) & -\phi_{yu}(l-na+1) & \cdots & -\phi_{yu}(l+nb-na) \\ \hline -\phi_{yu}(l) & \cdots & -\phi_{yu}(l-na+1) & \phi_{uu}(0) & \cdots & \phi_{uu}(nb-1) \\ \vdots & & \vdots & \vdots & & \vdots \\ -\phi_{yu}(l+nb-1) & \cdots & -\phi_{yu}(l+nb-na) & \phi_{uu}(nb-1) & \cdots & \phi_{uu}(0) \end{bmatrix} \tag{16}$$

where $\phi_{yy}(k)$, $\phi_{uu}(k)$ and $\phi_{yu}(k)$ are correlation functions given below:

$$\phi_{yy}(k) = \lim_{N \to \infty} \frac{1}{N} \sum_{i=1}^{N} y(i) y(i+k) \tag{17}$$

$$\phi_{uu}(k) = \lim_{N \to \infty} \frac{1}{N} \sum_{i=1}^{N} u(i) u(i+k) \tag{18}$$

$$\phi_{yu}(k) = \lim_{N \to \infty} \frac{1}{N} \sum_{i=1}^{N} y(i) u(i+k) \tag{19}$$

In order that the correlation matrix R be a non-singular matrix, the (na+nb) vectors constituting the matrix R must be linearly independent.

Since the system noise is the white noise and $l \geq 0$, the identification condition of the dynamic characteristic of the process is that the correlation matrix R be a non-singular matrix. In a case of a non-linear controller, $nu \geq 2$.

Then, substitution of 0 for r(k), nf and ng in Eqs. (2) and (3) results in:

$$u(k) = -\sum_{i=1}^{nu} g_0^{(i)} y(k)^i \tag{20}$$

Multiplication by y(k−j) of both sides of Eq. (20) provides:

$$\phi_{yu}(j) = -\sum_{i=1}^{nu} g_0^{(i)} \cdot \phi_{yy^i}(j) \tag{21}$$

$$= -(g_0^{(1)}, g_0^{(2)}, \ldots, g_0^{(nu)}) \cdot \begin{pmatrix} \phi_{yy}(j) \\ \phi_{yy^2}(j) \\ \vdots \\ \phi_{yy^{nu}}(j) \end{pmatrix}$$

Multiplication by u(k−j) of both sides of Eq. (20) provides:

$$\phi_{uu}(j) = (g_0^{(1)} g_0^{(2)} \ldots g_0^{(nu)}) \cdot \tag{22}$$

$$\begin{pmatrix} \phi_{yy}(j), & \phi_{yy^2}(j), & \ldots, & \phi_{yy^{nu}}(j) \\ \phi_{y^2y}(j), & \phi_{y^2y^2}(j), & \ldots, & \phi_{y^2y^{nu}}(j) \\ \vdots & & & \vdots \\ \phi_{y^{nu}y}(j), & & \ldots, & \phi_{y^{nu}y^{nu}}(j) \end{pmatrix} \begin{pmatrix} g_0^{(1)} \\ g_0^{(2)} \\ \vdots \\ g_0^{(nu)} \end{pmatrix}$$

As may be seen from Eq. (21), a correlation function of high order of y(k) is generated with any element of the submatrix $R_{yu}$. Therefore, we cannot constitute elements of the matrix $R_{yu}$ even with all the elements of the matrix $R_{yy}$. As also seen from Eq. (22), a correlation function of higher order than that for the matrix $R_{yu}$ is generated for the matrix $R_{uu}$. Thus, the matrix R is always non-singular.

From the above description, it is seen that the dynamic characteristic of the process in a closed control loop may be identified with a non-linear controller.

FIG. 2 is a block diagram of the embodiment of the present invention. In this embodiment, a non-linear control signal is added as an auxiliary input signal to the output signal from the controller i.e. an input signal to the process. A process 10 to be controlled is a process for chemical plants, steelmaking plants and so on. The process value to be controlled is a temperature, pressure or the like. A process value is controlled by an input signal to the process 10 and is supplied as a process output signal y(t) to one input and of a subtracter 12. An reference signal r(t) from a reference signal generator 14 is supplied to the other input end of the subtracter 12. The subtracter 12 takes a difference between the two input signals and supplies a control deviation signal e(t) (=r(t)−y(t)) to a sampling circuit 16. The sampling circuit 16 samples the difference signal e(t) at a constant period $\tau$ and supplies a sampled difference signal e*(k)

to a PID controller 18 and a non-linear controller 20. Symbol * denotes a sampled signal and $t=k\tau$. Although the PID controller 18 alone does not satisfy the identification condition of the dynamic characteristic of the process as described above, these conditions are satisfied by supplementarily using the non-linear controller 20. The PID controller 18 processes the sampled difference signal $e^*(k)$ in accordance with the PID algorithm of known velocity type to be shown below using sampled-value PID control constants Kc (proportional gain), Ti (integration time constant), and Td (differentiation time constant). The PID controller 18 then produces a control signal $u_0^*(k)$.

$$u_0^*(k) = u_0^*(k-1) + \Delta u_0^*(k) \tag{23}$$

$$\Delta u_0^*(k) = Kc\left[e^*(k) - e^*(k-1) + \frac{T}{Ti}e^*(k) + \frac{Td}{T}\{e^*(k) - 2e^*(k-1) + e^*(k-2)\}\right] \tag{24}$$

The non-linear operation of the non-linear controller 20 is expressed by $v^*(k)=F(Z^{-1}, e^*(k))$ where $v^*(k)$ is a non-linear signal generated by the generator 20. Since the non-linear signal preferably contains high harmonics, an ON/OFF signal is used, for example. Thus, the non-linear controller 20 generates the non-linear signal $v^*(k)$ expressed by the following relation:

$$v^*(k) = Ar \cdot \text{sign}(e^*(k)) \tag{25}$$

where Ar is a constant, and $$\text{sign}(e^*(k)) = 1 \quad \text{if } e^*(k) \geq 0 \text{ and}$$
$$= -1 \text{ if } e^*(k) < 0$$

The control signal $u_0^*(k)$ from the PID controller 18 and the non-linear signal $v^*(k)$ from the non-linear controller 20 are supplied to an adder 22 which generates a sum signal $u^*(k)=u_0^*(k)+v^*(k)$ of the input singals. This sum signal is supplied to a holding circuit 24 for holding of 0th order expressed by $$\frac{1 - e^{-\tau s}}{s}.$$

The holding circuit 24 thus supplies a continuous control signal $u(t)$ to the process 10. The process value is then controlled by the control signal $u(t)$. Since the non-linear signal $v^*(k)$ is contained in the control signal $u(t)$, the dynamic characteristic of the process can be identified in a closed control loop.

Figure 3:
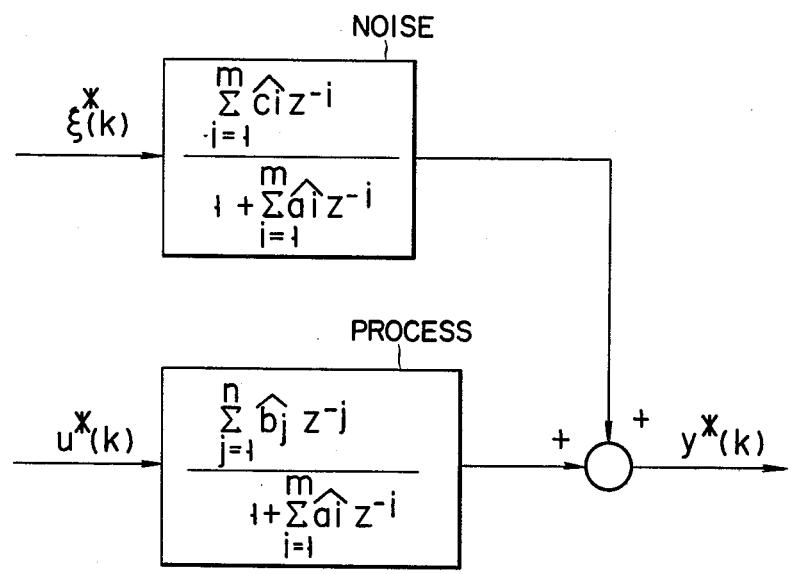
FIG. 3 is an equivalent circuit diagram of the process for explaining the operation of the process control apparatus shown in FIG. 2.

Meanwhile, the output signal $y(t)$ from the process 10 is also supplied to a sampling circuit 26 which operates in synchronism with the sampling circuit 16. The sum signal $u^*(k)$ (input signal to the process 10 through the holding circuit 24) from the adder 22 and the output signal $y^*(k)$ from the sampling circuit 26 are supplied to a pulse transfer function identifying circuit 28. The identification method of this circuit 28 adopts an identification filter of recursive approximation maximum likelihood type which resembles the algorithm of a Kalman filter. FIG. 3 shows an equivalent circuit diagram of the process in order to explain this identification algorithm. The identified values of parameters $\hat{a}_i$, $\hat{b}_j$, and $\hat{c}_i$ (where $i=1, 2, \ldots, m$, and $j=1, 2, \ldots, n$) of the dynamic characteristic are represented by vector $\hat{\theta}$ given below:

$$\hat{\theta}^T = [\hat{a}_1, \hat{a}_2, \ldots, \hat{a}_m, \hat{b}_1, \hat{b}_2, \ldots, \hat{b}_n, \hat{c}_1, \hat{c}_2, \ldots, \hat{c}_m] \tag{26}$$

$\hat{\theta}$ can be obtained by the algorithm of Eqs. (27) to (33) given below:

$$\hat{\theta}(k) = \hat{\theta}(k-1) + \frac{P(k-1) \cdot \psi(k) \cdot \epsilon(k)}{\lambda(k) + \psi^T(k) \cdot P(k-1) \cdot \psi(k)} \tag{27}$$

where $p(k)$ is a matrix of $\{(n+2m)\times(n+2m)\}$th order given by Eq. (28), $\epsilon(k)$ is an identification error given by Eq. (29), and $\psi(k)$ is a vector of $(n+2m)$th order given by Eq. (30).

$$P(k) = \left\{P(k-1) - \frac{P(k-1) \cdot \psi(k) \cdot \psi^T(k) \cdot P(k-1)}{\lambda(k) + \psi^T(k) \cdot P(k-1) \cdot \psi(k)}\right\}/\lambda(k) \tag{28}$$

$$\epsilon(k) = y^*(k) - \Phi^T(k) \cdot \theta(k-1) \tag{29}$$

$$= y^*(k) - [-y^*(k-1), -y^*(k-2), \ldots, -y^*$$
$$(k-m), u^*(k-1), u^*(k-2), \ldots, u^*(k-n), \epsilon(k-1),$$
$$\epsilon(k-2), \ldots, \epsilon(k-m)] \times \theta(k-1)$$

$$\psi^T(k) = [-\tilde{y}(k-1), -\tilde{y}(k-2), \ldots, -\tilde{y}(k-m), \tag{30}$$
$$\tilde{u}(k-1), \tilde{u}(k-2), \ldots, \tilde{u}(k-n), \tilde{\epsilon}(k-1),$$
$$\tilde{\epsilon}(k-2), \ldots, \tilde{\epsilon}(k-m)]$$

Elements of the vector $\psi^T(k)$ can be approximated as follows:

$$\tilde{y}(k) = \frac{y^*(k)}{1 + \sum_{i=1}^{m} \hat{C}_i Z^{-i}} \tag{31}$$

$$\tilde{u}(k) = \frac{u^*(k)}{1 + \sum_{i=1}^{m} \hat{C}_i Z^{-i}} \tag{32}$$

$$\tilde{\epsilon}(k) = \frac{\epsilon(k)}{1 + \sum_{i=1}^{m} \hat{C}_i Z^{-i}} \tag{33}$$

Symbol $\lambda(k)$ is a forgetting factor which is $\alpha(0.95 \leq \alpha \leq 1)$ in this case. The initial values for $\theta(0)$ and for $P(0)$ are respectively 0 and $\beta \cdot I$ (where $\beta$ is a real number of $10^3$ to $10^5$ and I is a unit matrix).

Figure 4:
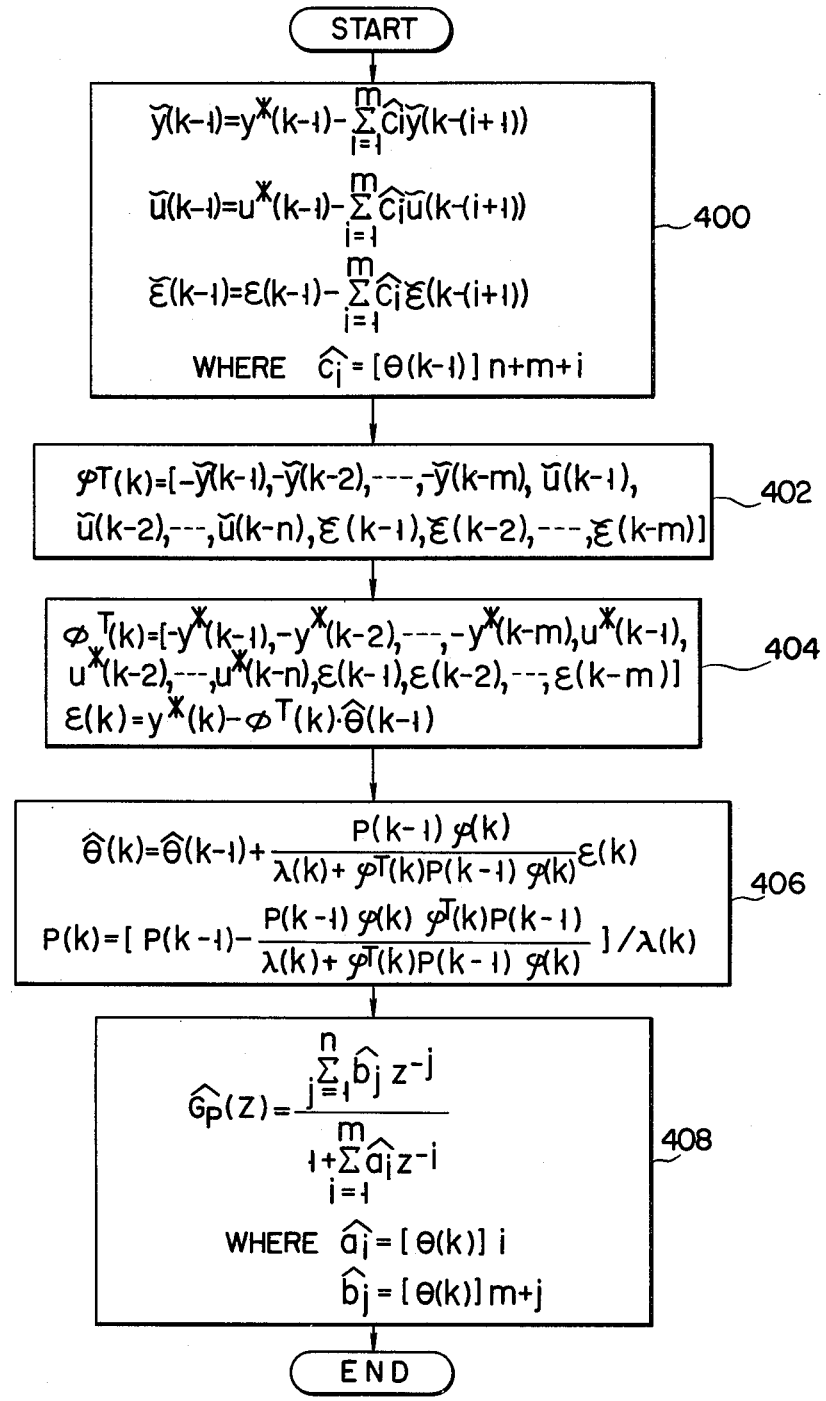
FIGS. 4 to 6 are flowcharts for explaining the operation of the proccess control apparatus shown in FIG. 2.

Every sampling time the input signal $u^*(k)$ and output signal $y^*(k)$ are received, the pulse transfer function identifying circuit 28 calculates the parameter $\hat{a}_i$ (where $i=1, 2, \ldots, m$) and $\hat{b}_j$ (where $j=1, 2, \ldots, n$) representing the dynamic characteristic of the process in accordance with the algorithm as described above. Using these parameters, the pulse transfer function identifying circuit 28 identifies a pulse transfer function $$Gp(Z) = \frac{\sum_{j=1}^{n} \hat{b}_j Z^{-j}}{1 + \sum_{i=1}^{m} \hat{a}_i Z^{-i}}$$

of the process. FIG. 4 is a flowchart showing the operation of the pulse transfer function identifying circuit 28. In step 400, elements $\tilde{y}$, $\tilde{u}$ and $\tilde{\epsilon}$ of the vector $\psi^T(k)$ are calculated. In step 402, the vector $\psi^T(k)$ is constituted according to Eq. (30). In step 404, a vector $\phi^T(k)$ is constituted and the identification error $\epsilon(k)$ is calculated according to Eq. (29). In step 406, the matrix P(k) and the vector $\theta(k)$ are obtained according to Eqs. (28) and (27). In step 408, the pulse transfer function $\hat{G}p(Z)$ is obtained using the parameters $\hat{a}_i$ and $\hat{b}_j$ in the identified vector $\theta(k)$.

The pulse transfer function $\hat{G}p(Z)$ thus obtained is supplied to a transfer function generator 30 which obtains the transfer function of the process in the Laplace operator (S) domain. The transfer function generator 30 operates according to the algorithm utilizing the fact that the step response of the pulse transfer function $\hat{G}p(Z)$ coincides that of the actual process. By division of the numerator:

$$\sum_{j=1}^{n} \hat{b}_j Z^{-j}$$

by the denominator:

$$1 + \sum_{i=1}^{m} \hat{a}_i Z^{-i},$$

the pulse transfer function $\hat{G}p(Z)$ can be rewritten as:

$$Gp(Z) = \sum_{i=1}^{\infty} \hat{g}_i Z^{-i} \quad (34)$$

Therefore, the step response $x(k)$ of the pulse transfer function $\hat{G}p(Z)$ is given by:

$$x(k) = \sum_{i=1}^{k} \hat{g}_i \quad (35)$$

$x(k)$ is a discrete function and its continuous function $x(t)$ is given by:

$$\tilde{x}(t) = \sum_{i=0}^{n-1} \hat{g}_i + \frac{g_m}{\lambda} \cdot t \quad (36)$$

where $(n-1)\tau \leq t < n\tau$. Laplace transformation of $x(t)$ results in $X(S)$ expressed by:

$$\tilde{X}(S) = \frac{e^{\tau S} - 1}{\tau S^2} \cdot \sum_{i=1}^{\infty} \hat{g}_i \cdot e^{-i\tau S} \quad (37)$$

If $\tilde{X}(S)$ is regarded as the step response of the transfer function $\tilde{G}p(S)$, $\tilde{G}p(S)$ is expressed as follows:

$$\tilde{G}p(S) = S \cdot \tilde{X}(S) = \frac{e^{\tau S} - 1}{\tau S} \sum_{i=1}^{\infty} \hat{g}_i \cdot e^{-i\tau S} \quad (38)$$

$$= \frac{e^{\tau S} - 1}{\tau S} \cdot \frac{\sum_{j=1}^{n} \hat{b}_j \cdot e^{-j\tau S}}{1 + \sum_{i=1}^{m} \hat{a}_i \cdot e^{-i\tau S}}$$

If the exponential function of $Gp(S)$ is expanded and $Gp(S)$ is given in a denominator expression including terms up to the third order of S, then:

$$\tilde{G}p(s) = \frac{1}{\tilde{h}_0 + \tilde{h}_1 s + \tilde{h}_2 s^2 + \tilde{h}_3 s^3 + \ldots} \quad (39)$$

$$\tilde{h}_0 = D_0 \quad (40)$$

$$\tilde{h}_1 = D_1 - \frac{\tau}{2} \tilde{h}_0 \quad (41)$$

$$\tilde{h}_2 = D_2 - \frac{\tau}{2} \tilde{h}_1 - \frac{\tau^2}{6} \tilde{h}_0 \quad (42)$$

$$\tilde{h}_3 = D_3 - \frac{\tau}{2} \tilde{h}_2 - \frac{\tau^2}{6} \tilde{h}_1 - \frac{\tau^3}{24} \tilde{h}_0 \quad (43)$$

$$D_0 = A_0/B_0 \quad (44)$$

$$D_1 = (A_1 - D_0 \cdot B_1)/B_0 \quad (45)$$

$$D_2 = (A_2 - D_0 \cdot B_2 - D_1 \cdot B_1)/B_0 \quad (46)$$

$$D_3 = (A_3 - D_0 \cdot B_3 - D_1 \cdot B_2 - D_2 \cdot B_1)/B_0 \quad (47)$$

$$A_0 = 1 + \sum_{i=1}^{m} \hat{a}_i \quad (48)$$

$$A_1 = -\tau \sum_{i=1}^{m} i\hat{a}_i \quad (49)$$

$$A_2 = \frac{\tau^2}{2} \sum_{i=1}^{m} i^2 \hat{a}_i \quad (50)$$

$$A_3 = -\frac{\tau^3}{6} \sum_{i=1}^{m} i^3 \hat{a}_i \quad (51)$$

$$B_0 = \sum_{i=1}^{n} \hat{b}_i \quad (52)$$

$$B_1 = -\tau \sum_{i=1}^{n} i\hat{b}_i \quad (53)$$

$$B_2 = \frac{\tau^2}{2} \sum_{i=1}^{n} i^2 \hat{b}_i \quad (54)$$

$$B_3 = -\frac{\tau^3}{6} \sum_{i=1}^{n} i^3 \hat{b}_i \quad (55)$$

Figure 5:
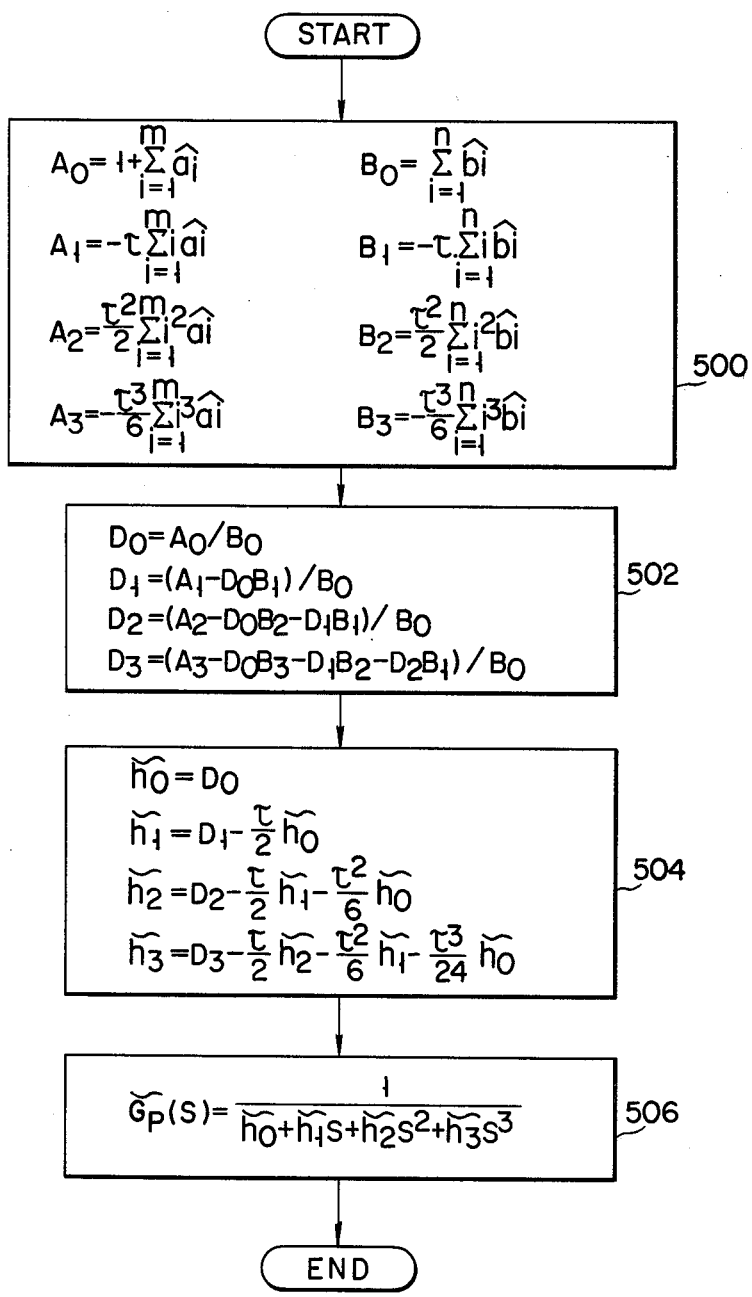

The transfer function generator 30 generates the transfer function $\tilde{G}p(S)$ of the S domain from the pulse transfer function $\tilde{G}p(Z)$ according to the algorithm as described above. FIG. 5 is a flowchart showing the operation of the transfer function generator 30. In step 500, $A_0$ to $A_3$ and $B_0$ to $B_3$ are calculated according to Eqs. (48) to (55). In step 502, $D_0$ to $D_3$ are calculated from $A_0$ to $A_3$ and $B_0$ to $B_3$ according to Eqs. (44) to (47). In step 504, $\tilde{h}_0$ to $\tilde{h}_3$ are calculated from $D_0$ to $D_3$ according to Eqs. (40) to (43). In step 506, the transfer function $\tilde{G}p(S)$ is obtained from $\tilde{h}_0$ to $\tilde{h}_3$ according to Eq. (39).

Figure 6:
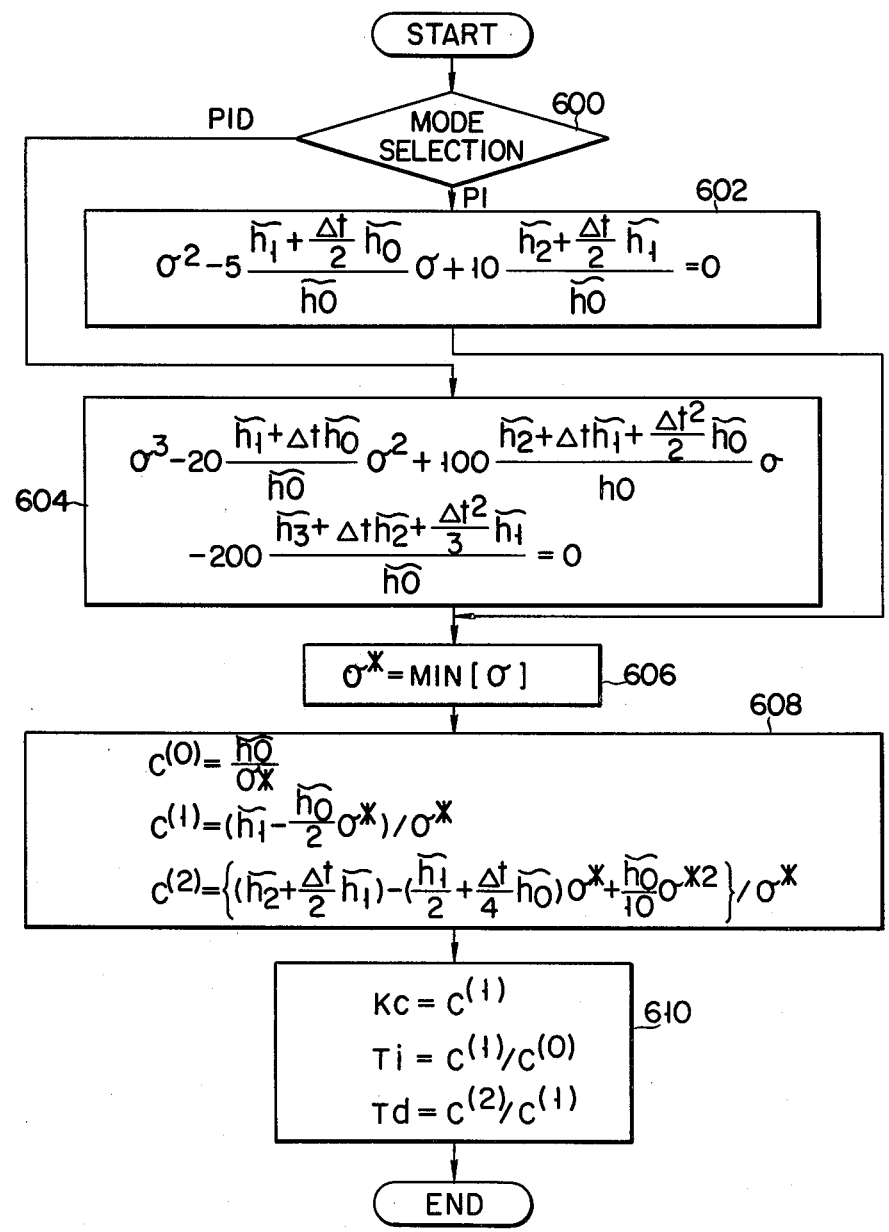

The transfer function Gp(S) output from the transfer function generator 30 is supplied to a PID control constant generator 32. According to the identified dynamic characteristic of the process, the PID control constant generator 32 calculates optimal PID control constants Kc, Ti and Td, and supplies them to the PID controller 18. The PID control constant generator 30 operates according to the method described in Toshiyuki Kitamori, "A design method for sampled-data control systems based upon partial knowledge about controlled processes" in (papers published by the Association of Measurements and Automatic Control, Vol. 15-5, September of 1979). FIG. 6 shows the algorithm of the operation of the PID control constant generator 32. If the differentiation time constant Td is 0, the PID controller 18 can perform the PI operation as well. Therefore, in step 600, a selection is made between the PI operation and the PID operation. The sampling period in this case is made Δt. If the PI operation is selected in step 600, the solution of the following relation of the second order of σ is obtained in step 602:

$$\sigma^2 - 5 \frac{\tilde{h}_1 + \frac{\Delta t}{2} \tilde{h}_0}{\tilde{h}_0} \sigma + 10 \frac{\tilde{h}_2 + \frac{\Delta t}{2} \tilde{h}_1}{\tilde{h}_0} = 0 \quad (56)$$

If the PID operation is selected in step 600, the following solution of the relation of the third order of σ is obtained:

$$\sigma^3 - 20 \frac{\tilde{h}_1 + \Delta t \tilde{h}_0}{\tilde{h}_0} \sigma^2 + 100 \frac{\tilde{h}_2 + \Delta t \tilde{h}_1 + \frac{\Delta t^2}{2} \tilde{h}_0}{\tilde{h}_0} \sigma$$
$$- 200 \frac{\tilde{h}_3 + \Delta t \tilde{h}_2 + \frac{\Delta t^2}{3} \tilde{h}_1}{\tilde{h}_0} = 0 \quad (57)$$

Of σ obtained, the least positive value of σ is obtained as σ* in step 606. In step 608, $C^{(0)}$, $C^{(1)}$ and $C^{(2)}$ as given below are obtained from σ* and $\tilde{h}_0$, $\tilde{h}_1$, and $\tilde{h}_2$.

$$C^{(0)} = \frac{\tilde{h}_0}{\sigma^*} \quad (58)$$

$$C^{(1)} = \left( \tilde{h}_1 - \frac{\tilde{h}_0}{2} \sigma^* \right) / \sigma^* \quad (59)$$

$$C^{(2)} = \left\{ \left( \tilde{h}_2 + \frac{\Delta t}{2} \tilde{h}_1 \right) - \left( \frac{\tilde{h}_1}{2} + \frac{\Delta t}{4} \tilde{h}_0 \right) \sigma^* + \frac{\tilde{h}_0}{10} \sigma^{*2} \right\} / \sigma^* \quad (60)$$

The sampled-value PID control constants Kc, Ti, and Td and $C^{(0)}$, $C^{(1)}$ and $C^{(2)}$ hold the relations below:

$$Kc = C^{(1)} \quad (61)$$

$$Ti = C^{(1)}/C^{(0)} \quad (62)$$

$$Td = C^{(2)}/C^{(1)} \quad (63)$$

In step 610, the PID control constants Kc, Ti and Td are obtained according to Eqs. (61) to (63). In this manner, the PID control constant generator 32 calculates the sampled-value PID control constants based on the dynamic characteristic of the process which has been identified and supplies them to th PID controller 18. According to the control constants received, the PID controller 18 generates a process control signal $u_0^*(k)$. Then, the process 10 is controlled according to its dynamic characteristic.

According to the embodiment of the present invention, since the non-linear signal is always included in the control signal supplied to the process, the dynamic characteristic of the process in the closed control loop can be always identified. According to the identification result obtained, the PID control constants may be determined, and the PID controller can then respond to the changes in the dynamic characteristic of the process. In this manner, the identification of the dynamic characteristic of the process and the adjustments of the PID control constants are performed simultaneously during the closed loop control of the process, so that the process may be controlled within a short period of time and the operating efficiency of the process may be improved. Since the identification of the pulse transfer function of the process is performed by the iterative method, the process control may not be adversely affected by the noise.

The present invention is not limited to the particular embodiment described above. Therefore, various changes and modifications may be made within the scope and spirit of the present invention. Several modifications will now be described below. In the embodiment described above, the non-linear control signal generated by the non-linear controller 20 is always added to the process control signal to constantly change the process value. However, with a process wherein change in the process value is not preferably, the non-linear signal may be selectively added to the process control signal. This may be achieved by, for example, incorporating a switch between the non-linear controller 20 and the adder 22. In this case, after the dynamic characteristic of the process is identified and the optimal PID control constants are obtained, the switch is opened so as to supply the output signal from the PID controller 18 alone to the process 10.

The recursive approximation maximum likelihood method is used for identification of the pulse transfer function of the process in the embodiment described above. However, other methods which allow calculation of unbiased and unique estimator may be adopted. Such methods may include the extended least square method, instrumental variable method, the parameter identifying method of model reference adaptive system, and so on. The non-linear operation may be hysteresis, multi-stage ON/OFF, or high-order non-linear operation in place of the ON/OFF operation.

What we claim is:
1. A process control apparatus comprising:
first sampling means for sampling a control deviation signal of a process value signal and a reference signal;
PID controlling means for performing a sampled-value PID calculation with respect to an output signal from said first sampling means by using sampled-value PID control constants and for generating a PID control signal;
non-linear controller means for converting an output signal from said first sampling means to a non-linear signal;
holding means for holding a sum signal of the PID control signal and the non-linear signal and for supplying a hold signal controlling a process value to a process;
second sampling means for sampling the process value signal; and
control constant generating means for calculating sampled-value PID control constants on the basis of an output signal from said second sampling means and the sum signal of the PID control signal and the non-linear signal and for supplying an operation result to said PID controlling means.

2. A process control apparatus according to claim 1, wherein said non-linear controller means comprises a relay which produces a signal v*(k) given:

$$v^*(k) = Ar \cdot \text{sign}(e^*(k))$$

where Ar is a constant, and e*(k) is an output signal from said first sampling means, sign(e*(k)) being 1 if e*(k)≧0 and sign(e*(k)) being −1 if e*(K)<0.

3. A process control apparatus according to claim 1, wherein said first sampling means and said second sampling means operate in synchronism with each other.

4. A process control apparatus according to claim 1, wherein said control constants generating means comprises:

a circuit for identifying a pulse transfer function of the process by recursively calculating a quotient which is obtained by dividing the output signal from said second sampling means by the sum signal of the PID control signal and the non-linear control signal, a transfer function generating circuit for converting an output signal from the identifying circuit to a transfer function of the process in a Laplace operator domain, and a control constant generating circuit for generating sampled-value PID control constants on the basis of the transfer function generated by the transfer function generating circuit.

5. A process control apparatus according to claim 4, wherein said identifying circuit performs identification by a recursive approximation maximum likelihood filter.

* * * * *